US007941817B2

(12) United States Patent
Khusheim (10) Patent No.: US 7,941,817 B2
(45) Date of Patent: May 10, 2011

(54) SYSTEM AND METHOD FOR DIRECTED TELEVISION AND RADIO ADVERTISING (75) Inventor: Raed Khusheim, Damman (SA)

(73) Assignee: Selevision FZ-LLC, Dubai Media, Dubai (AE)

( * ) Notice: Subject to any disclaimer, the term of this patent is extended or adjusted under 35 U.S.C. 154(b) by 1775 days.

(21) Appl. No.: 10/151,244

(22) Filed: May 21, 2002

(65) Prior Publication Data

US 2003/0221191 A1    Nov. 27, 2003

(51) Int. Cl.
H04N 7/025 (2006.01)
(52) U.S. Cl. ............................................. 725/32; 725/34
(58) Field of Classification Search ........................ 725/34
See application file for complete search history.

(56) References Cited

U.S. PATENT DOCUMENTS

| | | | |
|---|---|---|---|
| 5,155,591 A | 10/1992 | Wachob | |
| 5,515,270 A | 5/1996 | Weinblatt | |
| 5,621,456 A * | 4/1997 | Florin et al. | 725/43 |
| 5,652,615 A | 7/1997 | Bryant et al. | |
| 5,796,952 A | 8/1998 | Davis et al. | |
| 5,940,073 A | 8/1999 | Klosterman et al. | |
| 5,948,061 A | 9/1999 | Merriman et al. | |
| 6,002,393 A | 12/1999 | Hite et al. | |
| 6,177,931 B1 | 1/2001 | Alexander et al. | |
| 7,136,871 B2 * | 11/2006 | Ozer et al. | 707/104.1 |
| 2002/0065929 A1 * | 5/2002 | Kamentsky et al. | 709/231 |
| 2002/0116712 A1 * | 8/2002 | Schein et al. | 725/58 |
| 2004/0181808 A1 * | 9/2004 | Schaefer et al. | 725/89 |
| 2005/0210502 A1 * | 9/2005 | Flickinger et al. | 725/34 |
| 2005/0235323 A1 * | 10/2005 | Ellis et al. | 725/58 |
| 2007/0067800 A1 * | 3/2007 | Wachtfogel et al. | 725/42 |

OTHER PUBLICATIONS

Written Opinion in corresponding PCT application, application No. PCT/US03/15818, mailed Jul. 22, 2005

* cited by examiner

Primary Examiner — Brian T Pendleton
Assistant Examiner — Olugbenga Idowu
(74) Attorney, Agent, or Firm — Banner & Witcoff, Ltd.

(57) ABSTRACT

A method and a device that presents a broadcast commercial message selects a commercial message for presentation based on user profile criteria. A programming content signal is received at a customer premises equipment (CPE). A stored commercial message is selected for presentation during presentation of the programming content signal. The selected commercial message contains summary information related to an informational content of the selected commercial message, and is selected based on the summary information contained by the selected commercial message. Each selected commercial message is then presented during the programming content signal by inserting each selected commercial message into the received programming content signal by presenting the selected commercial message in place of the programming content signal. Information relating to each commercial message presented and/or an interaction with a user can be recorded and sent to a central location.

34 Claims, 4 Drawing Sheets

SYSTEM AND METHOD FOR DIRECTED TELEVISION AND RADIO ADVERTISING

BACKGROUND OF THE INVENTION

1. Field of the Invention

The present invention relates to targeted commercial messages. More specifically, the present invention relates to a system and method for targeting audiences and controlling presentation of commercial messages in a broadcast environment.

2. Background of the Related Art

In the United States and many other industrialized countries, most television and radio is commercial in nature. Accordingly, television viewers (or radio listeners, as the case may be) are assumed to view (or listen to) the commercial messages, or advertisements, that broadcast as part of the programming content to which they are tuned. (As used herein, viewer and listener are synonymous terms.) Consequently, a broadcaster sells advertising time to sponsors, and sponsors generally try, as best possible, to target commercial messages to an anticipated audience. For example, Saturday morning children's television programming typically includes commercial messages that are directed to children. Similarly, programming intended to appeal to teenage girls typically includes commercial messages for products that appeal to teenage girls, and so on.

Systems have been developed for targeting delivery of advertisements over a telecommunications network, such as the Internet. For example, U.S. Pat. No. 5,948,061 to Merriman et al. discloses a targeted advertisement system that is based on a non-generalized, non-broadcast system model that uses a one-to-one connection between an advertisement source and a receiver. Advertisement targeting is based on tracking the particular Internet websites that a user accesses and by generating a user-specific profile for each tracked user. A user profile is stored locally to a user (i.e., on the user's computer), and is used and updated by a targeted advertising application. Such targeted advertisement systems, however, cannot work in a broadcast environment, such as that for television and radio, because a broadcast environment does not provide a one-to-one connection between a broadcaster and particular members of a broadcast audience. Consequently, there is no reliable way for a broadcaster to generate a user profile because there is no reliable way to determine which particular audience members are viewing programming content.

Moreover, there is not a convenient way for a sponsor to target commercial messages to a specific audience in a general broadcast environment, let alone for a sponsor to directly determine whether a particular commercial message was viewed or has generated any specific interest. Additionally, there is not a convenient way for a particular audience member to become a willing target of a specific type of commercial message other than by watching content directed to the corresponding specific audience. For example, a viewer who is interested in purchasing a new car cannot voluntarily become the target of selected advertising that is intended only for new car buyers. Instead, the viewer must currently view programming in which new car advertising is typically broadcast.

Consequently, what is needed is a way to provided directed advertising in a broadcast media environment, such as television and radio. Additionally, what is needed is a way to provide feedback to an advertiser regarding undirected and directed advertising in a broadcast media environment.

BRIEF SUMMARY OF THE INVENTION

The present invention provides a way to provided directed advertising in a broadcast media environment, such as television and radio. Additionally, the present invention provides a way to provide feedback to an advertiser regarding undirected and directed advertising in a broadcast media environment.

The advantages of the present invention are provided by a method and a device for presenting a commercial message. According to the invention, a programming content signal is received at a customer premises equipment (CPE) from, for example, a television broadcast signal, a radio broadcast signal, a cable television signal, a satellite broadcast signal, or a signal that is contained in a storage medium. The CPE can be one of a stand-alone device, part of a radio, part of a television set, part of a satellite receiver, part of a videocassette recorder, part of a digital versatile disk (DVD) device, and part of a personal video recorder device. At least one stored commercial message, such as an advertisement, an emergency announcement and/or a public service announcement, is selected for presentation during presentation of the programming content signal. A portion of the selected commercial message contains summary information related to an informational content of the selected commercial message. The selected commercial message is selected based on the summary information contained by the selected commercial message. Each selected commercial message is then presented during the programming content signal by inserting each selected commercial message into the received programming content signal by presenting the selected commercial message in place of the programming content signal. Each selected commercial message can be presented with at least one commercial message contained in the programming content signal. Information can be received from a user that is interactive with the programming content signal and/or at least one commercial message signal.

At least one commercial message signal is received containing at least one commercial message. The commercial message signal can be received from a television broadcast signal, a radio broadcast signal, a cable television signal, a satellite broadcast signal, or a signal that is received from a storage medium. A portion of each received commercial message contains the summary information related to an informational content of the commercial message. At least one commercial message is selectively stored based on the summary information contained in the commercial message, such as by determining whether the summary information contained in each commercial message matches a predetermined set of criteria. The predetermined set of criteria includes at least one of geographical, user demographic information, user profile information and/or a default set of criteria.

The summary information that relates to the informational content of the commercial message includes information related to at least one of an identification number of the commercial message, a length of the commercial message; a predetermined time for presenting the commercial message; a demography of a targeted audience for the commercial message; at least one interactivity option associated with the commercial message, a priority for presenting the commercial message; a number of times for presenting the commercial message, a frequency for presenting the commercial message, at least one broadcast channel associated with the commercial message, a programming content associated with the commercial message; a predetermined time duration for presenting the commercial message, a commercial message group number associated with at least one other commercial message, and geographical information associated with the commercial message. Demography information for the target audience includes information relating to at least one of a target age, a target gender, a marital status, a relative income, a language, an occupation and a personal interest. When at least one interactivity option is associated with the commercial message, at least one interactivity option includes information related to at least one of a request for additional information and purchasing options.

Information relating to each commercial message presented and/or an interaction with a user as a result of presenting a commercial message can be recorded and sent to a central location.

When the received programming content signal includes a commercial message time slot, the commercial message time slot is determined, and at least one stored commercial message is selected for presentation during the commercial message time slot. Each selected commercial message is then presented during the commercial message time slot by inserting each selected commercial message into the received programming content signal during the commercial message time slot. The commercial message time slot for the received programming content signal can be determined by receiving a warning signal containing information relating to the commercial message time slot, by downloading commercial message time slot information from a central location, or by recording a beginning and an end time for a corresponding commercial message time slot.

The received programming content signal can also be stored. Subsequently, the stored programming content signal can be presented and a commercial message time slot can be determined for the stored programming content signal. At least one stored commercial message is selected for presentation during presentation of the stored programming content signal based on the summary information contained by the selected commercial message, and each selected commercial message is presented during presentation of the stored programming content signal by inserting each selected commercial message into the programming content signal. Alternatively, at least one stored commercial message is then selected for presentation during the commercial message time slot for the stored programming content signal based on the summary information contained by the selected commercial message. Each selected commercial message is presented during the commercial message time slot for the stored programming signal by inserting each selected commercial message into the received programming content signal during the commercial message time slot. Accordingly, each selected commercial message can be presented with a commercial message contained in the programming content signal.

A signal can be received for skipping the commercial time slot for the stored programming signal so that no commercial messages contained in the stored programming content signal will be presented during the commercial time slot for the stored programming signal. Alternatively, the present invention can determine whether a commercial message contain in the commercial message time slot for the stored programming signal can not be skipped, in which case each commercial message determined not to be skipped will be presented during at least the commercial message time slot for the stored programming content signal.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

The present invention a system and method for directing messages to a target audience using a broadcast environment, such a television, radio and other broadcast environment, without requiring a dedicated channel or signal for each respective target audience. According to the invention, commercial messages, such as advertising, and other types of messages, such as emergency announcement, public service announcements and the like, are broadcast in a general and/or selected manner, and can be directed to a target audience.

Additionally, the present invention allows commercial messages having interactive options with commercial messages to be presented to an audience in a general broadcast environment. Moreover, the present invention allows questionnaires to be delivered to a targeted audience and responses to the questionnaires to be compiled and provided to, for example, an advertising entity.

Figure 1:
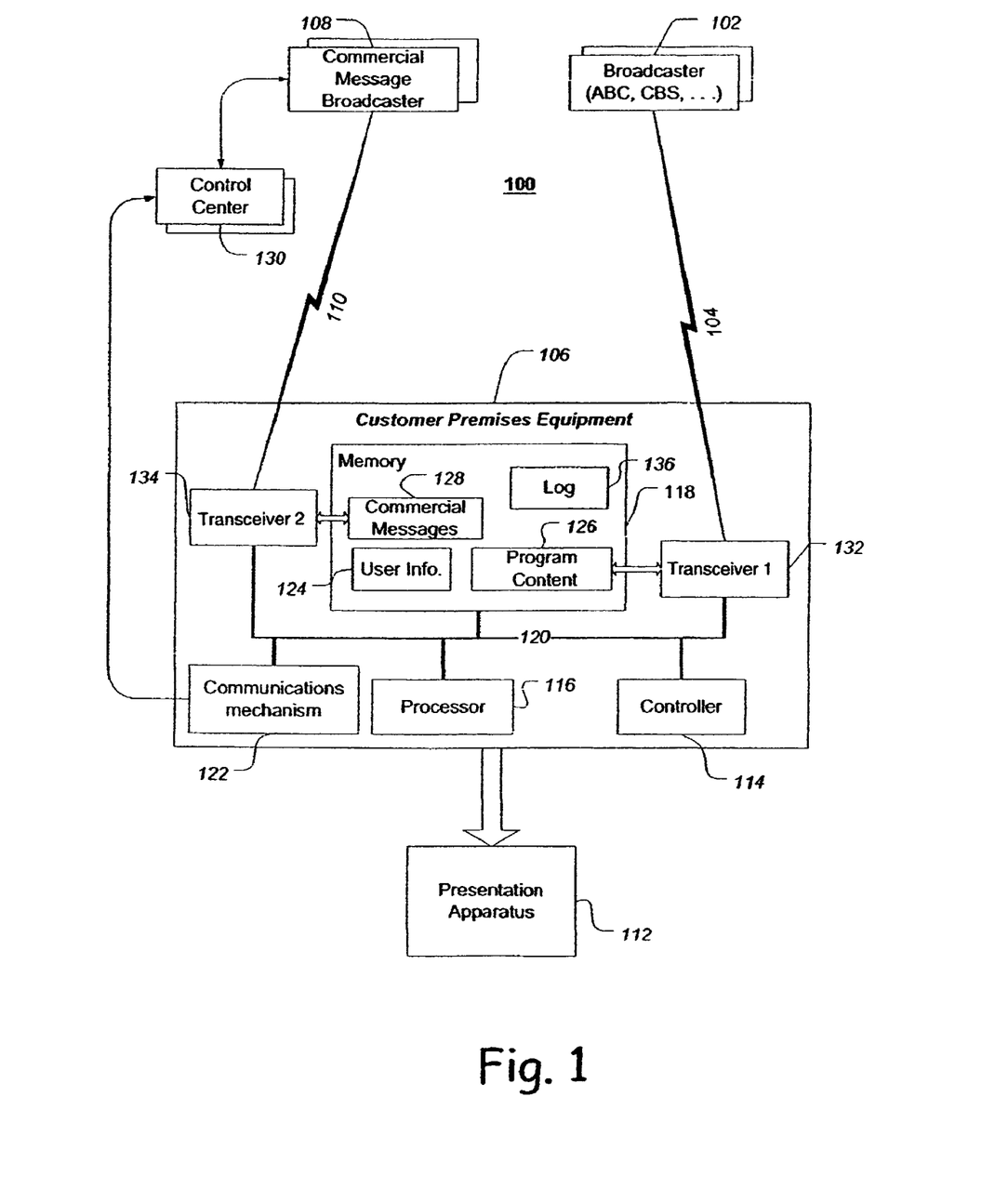
FIG. 1 shows a functional block diagram of an exemplary embodiment of a system for targeting commercial messages according to the present invention.

FIG. 1 shows a functional block diagram of an exemplary embodiment of a system 100 for targeting commercial messages according to the present invention. One or more broadcasters 102 transmit regular broadcast signals 104 in a well-known manner. Broadcasters 102 may be television (TV) or radio broadcasters, such as NBC, ABC, PBS, CBS, CNN, and the like. Broadcast signals 104, as used herein may be television or radio broadcast signals, may be analog or digital, and may be transmitted in a well-known manner, such as by way of an antenna (i.e., normal television and radio broadcast), cable, satellite broadcast, and the like, or combinations thereof. For example, CNN may broadcast a signal via satellite that may be received by a cable television service provider and rebroadcast to cable television subscribers. ABC, for example, may broadcast a signal in local regions, and via satellite and cable. The present invention operates independently of manner in which signals 104 are broadcast from broadcasters 102.

Broadcast signals 104 are received by a customer premises equipment (CPE) 106 and used by an audience, such as a viewer, listener and the like depending on the particular programming content and broadcast technology of the received broadcast signals. As used herein, the terms "customer premises equipment" and CPE generally refer to equipment that receives and decodes television and/or radio programming signals that are transmitted by, for example, broadcast systems, cable systems and/or by direct satellite broadcast systems. While only a single CPE 106 is shown in FIG. 1, it should be understood that system 100 could include a plurality of CPEs 106.

According to the invention, CPE may include hardware and/or software that is used for receiving and decoding functions whether the hardware and/or software is included in a set-top converter or box, a television set, a radio, a video recorder (VCR), a personal digital recorder (PDR), a personal video recorder (PVR), digital video recorder (DVR), a computer, a monitor or any now known or later developed device that permits presentation of programming content. A CPE may also include hardware and/or software used for accessing or downloading information and/or data from a public or privately accessible communications network, such as the Internet, for presentation.

Again referring to FIG. 1, in addition to regular broadcasters 102, one or more commercial message broadcasters 108, which each may or may not be a separate entity from a regular broadcaster 102, may also broadcast commercial message signals 110 that are received by CPE 106. Commercial message signals 110, as used herein, may be television or radio broadcast signals, may be analog or digital, and may be transmitted in a well-known manner, such as by way of an antenna (i.e., normal television and radio broadcast), cable, satellite broadcast, and the like, or combinations thereof. Unless stated otherwise herein, the present invention operates independently of manner in which commercial message signals 110 are broadcast from the commercial message broadcasters 108.

The exemplary embodiment of CPE 106 shown in FIG. 1 includes a controller 114, a processor 116 and a memory 118 that are coupled together by a data/control bus 120. While shown as separate devices or components, controller 114 and processor 116 may be the same device. Further, controller 114 and/or processor 116 may comprise a plurality of components that are each appropriate for the type of processing required, such as digital signal processing, compression and decompression of images, and the like.

Memory 118 may include random access memory (RAM) storage space, disk storage devices and/or any other types of memory, such as removable and/or external memory devices, and includes sufficient memory space for containing a plurality of databases and/or data structures that are used for providing the features of the present invention. For example, memory 118 preferably includes a database 124 for user information and a database 128 for commercial message content.

Commercial messages stored in commercial message database 128 can be stored in any known and appropriate manner, including, but not limited to, an Audio Video Interleaved (AVI) file format and the MPEG (Moving Pictures Expert Group) standards. Commercial messages may be stored in analog or digital form, and on any kind of storage media, including CDs, hard disks, flash RAM and the like. Preferably, the particular storage arrangement and medium used should have sufficient speed for accessing and presenting stored commercial messages.

Additionally, memory 118 can include a database 126 for broadcast programming content. User information database 124 may include user profile information for at least one user and possibly a plurality of users. User profile information may be received from each respective user, such as by querying a user with a set of user profiling questions, and/or may be collected and compiled over a period of time, such as by querying a user with a series of different user-profiling queries over a period of time. A user can input responses and create a user profile by inputting information using, for example, a remote controller, a keyboard and the like (not shown). User profile information may also include information compiled by CPE 106 based on viewing habits and responses to interactive commercial messages. The content and structure of the other databases contained in memory 118 are described below.

CPE 106 is coupled to a presentation apparatus 112. In an embodiment in which CPE 106 is a TV system, presentation device 112 may be a video display monitor and speakers. In an embodiment in which CPE 106 is a radio, presentation apparatus 112 may be one or more audio speakers or transducers.

CPE 106 also can include a communications mechanism 122 that is coupled to the data/control bus 120. Communication mechanism 122 may be, for example, a cable modem, a digital subscriber line (DSL) modem, a wireless modem, a virtual private network (VPN) network connection, an asynchronous transmission mode (ATM) network connection, a wireless data communication connection (such as GSM), a satellite connection, a local area network (LAN) connection, a wide area network (WAN) connection, an Internet connection, or similar. Communication mechanism 122 may be used for establishing a communication link between CPE 106 and a control center, or central location, 130 for providing feedback information from CPE 106 to one or more of commercial message broadcasters 108, and for receiving update information.

As shown by the exemplary embodiment of CPE 106 in FIG. 1, CPE 106 includes a transceiver 132 that is used for receiving broadcast signals 104 and a transceiver 134 that is used for receiving commercial message signals 110. Both transceivers 132 and 134 are coupled in a well-known manner to data/control bus 120. The exemplary embodiment of CPE 106 shown in FIG. 2 includes a transceiver 132 that is used both for regular broadcast signals 104 and for commercial message signals 110. While CPE 106 shown in FIGS. 1 and 2 includes only a single transceiver 132 that is used for receiving broadcast signals 104, it should be understood that CPE 106 could include a plurality of transceivers 132. Additionally, while CPE 106 shown in FIG. 1 shows only a single transceiver 134, it should be understood that CPE 106 could includes a plurality of transceivers 134.

The System Operation

Figure 2:
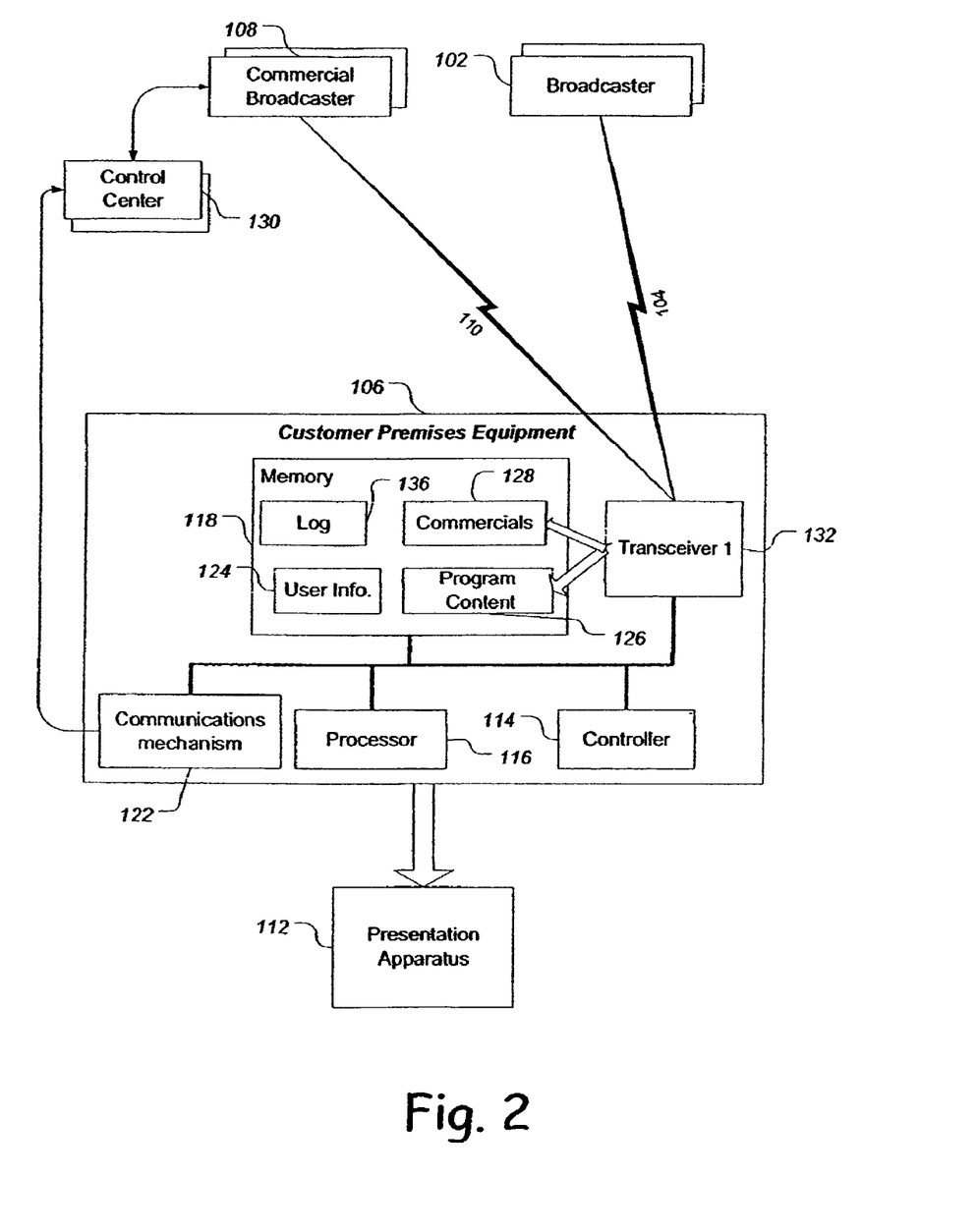
FIG. 2 shows a functional block diagram of another exemplary embodiment of a system for targeting commercial messages according to the present invention.

Referring to FIGS. 1 and 2, broadcasters 102 transmit regular broadcast signals 104, such as television or radio broadcast signals that include programming content and commercial messages. As used herein, the term commercial message generally refers to, but is not limited to, any type of advertising message, show or content that may also occupy one or more portions of a broadcast medium. For example, a commercial message may include combinations of audio and/or video components. A commercial message may also include textual components that can be presented using a textual output of a presentation device, such as closed captions. According to the present invention, there is no requirement that a commercial message be commercial in nature. Consequently, a commercial message may include high priority emergency messages that are broadcast by, for example, police or other governmental authority. At the highest priority, a message will be displayed (presented) immediately, without delay or without waiting for a commercial break in broadcast signal 104. Additionally, a commercial message can include a public service announcement (PSA).

Broadcast signals 104 are received by CPE 106 and used by a viewer, a listener or the like depending on the particular programming content and broadcast technology of the received broadcast signals. Depending on how CPE 106 is configured, commercial messages stored in commercial message database 128 can be presented in place of or in conjunction with the commercial messages contained in broadcast signals 104.

Commercial messages contained in commercial messages database 128 may be stored in, for example, a FIFO queue or some appropriate data structure, are each directly accessible based on, for example, a key. One exemplary data structure could be a pre-recorded list of commercial messages contained in commercial messages database 128 when CPE 106 is initially provided to a user. As CPE 106 is used, different commercial messages are stored in and/or removed from commercial messages database. According to the invention, there are a number of ways the content of commercial messages database is changed. For example, for the embodiment shown in FIG. 1, transceiver 134 receives commercial message signal 110 from commercial message broadcasters 108. Transceiver 134 is available to receive commercial messages at any time from any of commercial message broadcasters 108. For the embodiment of CPE 106 shown in FIG. 2, transceiver 132 is configured to receive commercial message signal 110 from commercial message broadcasters 108 at pre-set times, such as when CPE 106 is assumed to not be in use, such as at 2:00 a.m.

Alternatively, commercial broadcasters 108 can transmit commercial messages at all times, and transceiver 132 is configured to receive commercial message signals 110 when controller 114 of CPE 106 detects no user activity, such as receiving no commands from a remote control that would be entered by a user. As yet another alternative, regular broadcasters 102 can transmit commercial message signals 110 during a time period in which broadcast signals 104 are not being transmitted. For example, commercial message signals 110 may be transmitted during the horizontal and/or vertical blanking interval of a regular television broadcast signal.

Tagging and Coding Commercials and Shows

When commercial messages are transmitted, whether by commercial message broadcasters 108 or broadcasters 102, each commercial message preferably contains commercial message identification (ID), or serial number, information that can be used for filtering, tracking and/or logging purposes, as well as for selecting a particular commercial message for presentation.

The commercial message ID for the commercial message is decoded and evaluated with respect to user profile information stored in user information database 124 when CPE received a commercial message for determining whether to store the message in the commercial messages database 128. Only messages matching a default criteria or at least one user-profile criteria stored in user information database 124 are stored in commercial messages database 128. For example, default criteria could include a target region and a prime time presentation time. Another example of default criteria could include a language. Additionally, each respective CPE 106 in system 100 may have a unique factory-installed serial number or may have a group serial number that may be used for filtering received commercial messages. For example, an advertiser may be able to send commercial messages to specific serial numbers or to a group of CPEs having the same group number.

As an alternative embodiment of the present invention, each broadcast programming content (i.e., movies, sports, sitcoms, show previews, news and the like) has an associated show identifier (show ID) that can provide information about the show, such as playing time, rating, interactivity and the like. Thus, a CPE can use a show ID in conjunction with the commercial message ID for selecting commercial messages for storage in commercial message database 128.

Because more than one user may use the same CPE, a CPE preferably stores as many commercial messages that are needed for providing an adequate supply of commercial messages for each user. When CPE has a limited amount of storage space for commercial message database 128, the particular commercial messages that are stored can be prioritized based on, for example, the programming content that is consumed by each user, the amount of time each user consumes programming content, the time of day each user consumes programming content, etc. For example, in the situation in which a first user views significantly more television programming content than a second user, the CPE would store proportionately more commercial messages that are intended for the first user than for the second user. A CPE can also prioritize commercial message storage based on geographical location.

Each commercial message includes one or more of the following items or fields that can be part of the ID number information: the length of the commercial message; preferred dates and/or times for presenting the commercial message; preferred demography of the targeted audience for the commercial message, such as age, gender, location, marital status, relative income, language, occupation, personal interests, etc.; interactivity options that a can perform, such as a request for an e-mail reply for additional information, a request for a drop mail reply for additional information, a request for a connection to a live representative, a request for additional audio and/or video information, purchasing options (i.e., quantities and payment methods), a request for charging a credit account associated with CPE 106, and other requests for receiving information related to the commercial message; the priority for presenting the commercial message; the number of times and the frequency for presenting the commercial message, i.e., ten times over a two week period; the channel (s) and/or programming content for which the commercial message is targeted, i.e., CNN viewers; the life duration of the commercial message; and the targeted region of the commercial message, such as a country code, state abbreviation or code, a telephone area code, a zip code, and/or any other type of code representing a defined geographical region. Interactivity options may include options such as record, remind, order, buy, etc. For example, for a show preview, a user would be given the option to record the entire program (show) or to receive a reminder at the broadcast time for the show.

Commercial message ID may be encoded in any number of ways, including, without limitation, a fixed format, a variable format, a barcode format, text (that is recognized using optical character recognition (OCR)), alphanumeric information, audio information, color codes, DTMF signals, data packet identifier, and/or some other encoding in the vertical blanking interval (VBI). In some cases, the commercial ID may be a combination of more than one form of coding. Using the following encoding, an exemplary format for a commercial message ID can be FAAAAHLLEMC.

| Field | Definition |
|---|---|
| G Gender | 1 = Male, 2 = Female, 3 = Any or Both or don't care |
| AAAA Age group | Start at age xx and end at age yy (00 = don't care) |
| H Home ownership | 1 = own, 2 = rent, 3 = in family home, 4 = NA |
| LL Location (State) | 00 = don't care, 01 = NY, 02 = DC, 03 = CA, . . . |
| E Education | 0 = don't care, 1 = some college, 2 = graduate, 3 = Masters, 4 = PhD |
| M Marital Status | 1 = single, 2 = married, 3 = separated, 4 = divorced, 5 = widow, 0 = NA |
| C Channel | 0 = any, 1 = ABC, 2 = CBS, 3 = NBC, 4 = PBS, 5 = FOX, . . . |

Using the exemplary format, a commercial message having a commercial message ID of "11824202301340" would be targeted at people to who are: Males between the ages 18 and 24, are renting homes, and living in the District of Columbia (Location=DC), and have at least a Masters degree, and are divorced, regardless of the channel being viewed.

When interactivity option information are not included in the commercial message ID information because of, for example, space constraints, interactivity option information can be acquired separately, such as by a communicative link between CPE 106 and control center 130. When CPE 106 communicates with control center 130, CPE 106 may send information to control center 130 relating to which particular commercial messages are stored within CPE 106, such as commercial message ID information for each commercial message stored in CPE 106. In response, control center 130 may then upload appropriate interactivity option information for commercial messages stored in CPE 106.

Broadcasting Commercial Groups

In order to efficiently provide commercial messages to CPEs, the present invention provides a commercial message-grouping feature for broadcasting groups of commercial messages and/or programming previews to CPEs. Accordingly, each group of commercial messages has an associated unique commercial message group ID identifying the group so that a CPE can identify and evaluate the group for the CPE. For example, when a CPE already has commercial message group ID #18 stored in commercial message database 128, the CPE could switch to another commercial message source for receiving and storing a different group of commercial messages having a different commercial message group ID.

Additionally, commercial message grouping capability can be based on a specified group ID sequence and scheduled presentation times for each sequence of commercial message groups IDs. For example, when commercial message group ID #23 is scheduled to be broadcast at 2:23, 4:18 and 19:05 on a particular day, and when a CPE did not record commercial message group ID #23 at 2:23 on the particular day, the CPE will attempt to receive and store commercial message group ID #23 at another scheduled times without screening all groups of commercial messages that are broadcast. The message grouping capability of the present invention can also be used by a CPE to learn whether there are any new commercial message groups that should be evaluated. Broadcast schedules for commercial message groups, in addition to programming preview schedules, can be communicated to a CPE as part of a regular broadcast signal 104, a commercial message signal 110 and/or through a communication link between communication mechanism 122 and a control center 130.

Receiving and Storing Commercial Messages

Figure 3:
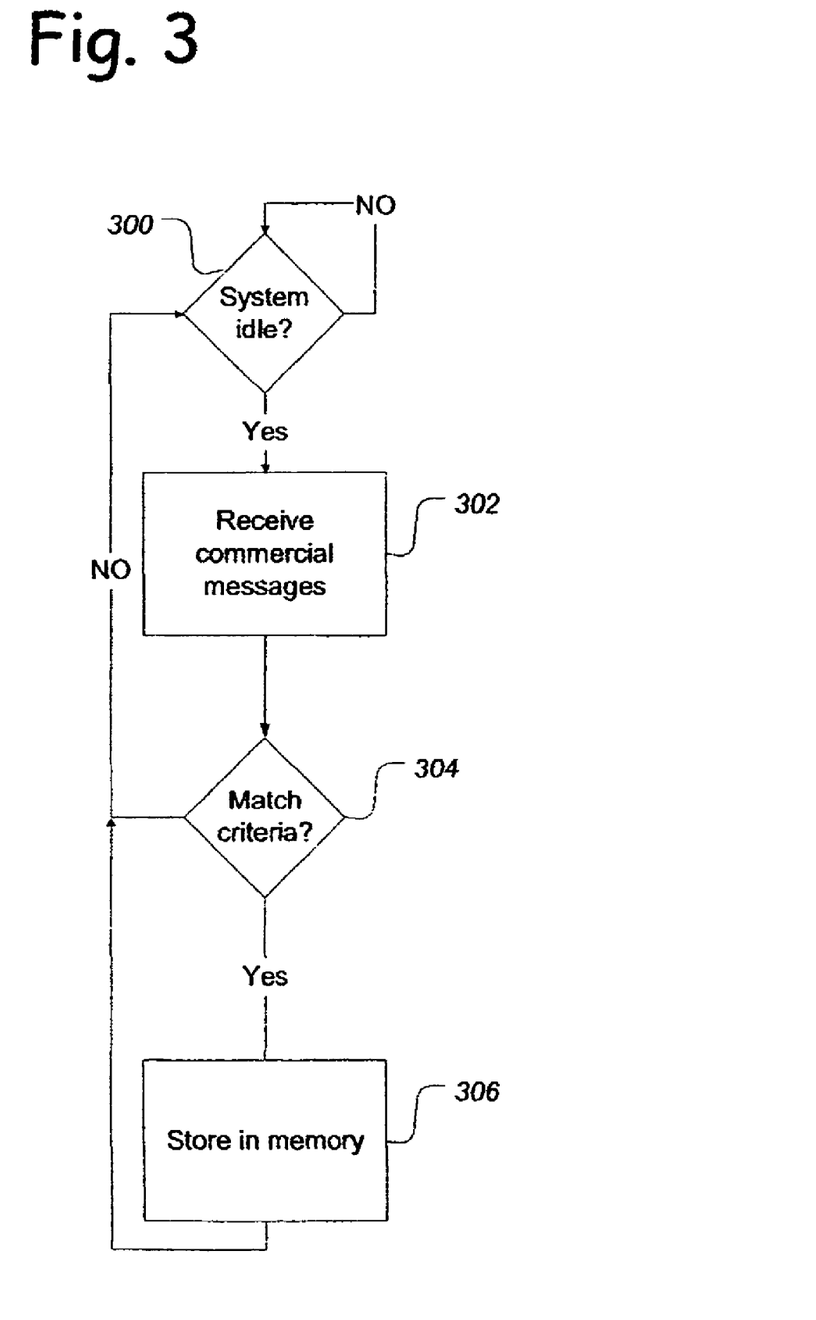
FIG. 3 shows a flow chart for an exemplary process for receiving, filtering and storing commercial messages in a CPE according to the present invention.

FIG. 3 shows a flow chart for an exemplary process for receiving, evaluating (filtering) and storing commercial messages in a CPE according to the present invention. At step 300, it is determined whether the CPE is in an idle state. When the CPE is determined to not be in an idle state, i.e., busy, flow remains at step 300. When the CPE is determined to be idle, flow continues to step 302 where the CPE tunes to, for example, a predetermined channel or a predetermined frequency and receives a single commercial message, a group of commercial messages, or is interrupted by the user. The received commercial messages can be stored in a temporary memory location in memory 114 before evaluation, or can be temporarily stored in commercial message database 128. Flow continues to step 304, where it is determined whether the received commercial message matches a default criteria and/or at least one user-profile criteria stored in user information database 124. When a received commercial message does not match the default criteria or at least one user profile criteria stored in user information database 124, the received commercial message is discarded and flow returns to step 300. When, at step 304, the received message matches the default criteria and/or at least one user profile criteria, flow continues to step 308 where the received message is stored in commercial message database 128. Flow returns to step 300, and the process is repeated. Alternatively, steps 304 and 306 can be performed at times when processor 116 and/or controller 114 are idle, or not heavily used.

When a CPE includes only one transceiver, such as the exemplary embodiment shown in FIG. 2, the CPE will tune the transceiver to one or more predetermined channels, or frequencies, at one or more predetermined times (or when CPE is idle), and receive commercial messages for evaluation and storage. When a CPE includes more than one tuner, such as the exemplary embodiment shown in FIG. 1, and the second tuner (i.e., transceiver 134) is not in use, the second transceiver could be tuned to one or more predetermined channels for receiving commercial messages. When a CPE has a sufficient enough stored commercial messages, the CPE can be configured to allow a user to use the second transceiver, for example, to record other programming content while the first transceiver is in use.

Additionally or in the alternative, commercial messages may be received from a CD, a videotape or the like. For example, a CD (DVD) may include various pre-recorded commercial messages that are accessed, evaluated and stored in commercial message database 128. Additionally, the commercial messages contained on the CD may be presented as a part of the programming content of the CD, or may be stored for subsequent presentation. As another alternative, commercial messages may be downloaded from a control center 130.

Filtering and Queuing

In a preferred exemplary embodiment of the present invention, CPE 106 provides a filtering and storing mechanism after decoding the commercial message ID and message information (if necessary) that is used for determining which particular commercial messages are stored in the memory 118. For example, filtering may be used for deleting unnecessary commercial messages that do not match the default criteria and/or at least one user profile criteria that is stored in user information database 124.

Filtering of commercial messages may be performed by the CPE 106 and/or control center 130. In some embodiments of the present invention, after establishing a communication link with control center 130, CPE 106 may inform the control center 130 of the particular commercial messages stored in CPE 106 by, for example, using the commercial message IDs of the commercial messages that are stored in commercial message database 128. For this alternative embodiment, control center 130 informs the CPE which particular commercial messages to keep, the queuing structure and order of the commercial messages IDs that are to be presented to the viewer based on, for example, the targeting criteria associated with programming content, the default criteria for CPE 106, at least one user profile criteria stored in CPE 106, and/or the commercial message IDs of the commercial messages stored in the CPE.

After decoding (the IDs if needed) and filtering the commercial messages (deleting unnecessary commercial messages that do not match with the user profile(s) associated with the CPE), the remaining commercial messages are stored in commercial messages database 128 for subsequent queuing.

Queuing Mechanism

CPE 106 includes a queuing mechanism that imposes at least a logical, if not a physical, organization for stored commercial messages in a well-known manner. For example, each queue could be organized using pointers to the commercial messages ID file location in commercial message database 128. Alternatively, each queue could store the entire content for each commercial message contained in the queue. CPE 106 preferably includes at least one queue for each user associated with CPE 106. Moreover, each queue preferably includes at least one commercial message, and a commercial message may be in more than one queue. In one exemplary alternative embodiment of the present invention, the queuing order for some or all of the queues contained in a CPE may be under the control of a control center.

Preferably, CPE 106 includes at least one of the following types of queues:

(a) A Next Set queue containing a set of commercial messages that are to be presented next. Preferably, a Next Set queue would contain the entire content of the next set of commercial messages instead of a set of pointers to the next set of commercial messages, thereby providing a fast and smooth presentation of the next set of commercial messages.

(b) A Guest queue containing commercial messages that are queued for a temporary user, such as a guest at a hotel or a short-term house guest.

(c) A General Targeting queue contains commercial messages that are queued based on no specific targeting criteria and are monitored for delivery.

(d) A Limited Targeting queue contains commercial messages that are queued for a limited target audience, such as teenagers, children, soccer fans, etc.

(e) A Channels and Shows queues containing commercial messages that are to be presented when a user is viewing a particular channel or show. For example, CPE 106 would have different queues for different channels, such as a CNN queue, an ABC queue, etc. In an exemplary preferred embodiment, a Channel and Shows queue contains commercial messages that are selected based on a consumption rate of commercial messages for each user and viewing habits for the various channels and shows for each user. When there is a limited storage space for commercial messages, CPE 106 would accordingly provide queue space priority to the channel having the highest consumption rate of commercial messages.

(f) A Conditional Delivery queues that contains commercial messages that are presented when certain conditions are met. For example, if a particular candidate wins an election, or if a particular sports team wins, then commercial messages contained in the Conditional Delivery queue are presented.

A CPE can create a particular queue based on at least one of the following considerations:

(1) the user consumption rate of commercial messages (average viewing time);
(2) the viewing habits of a user (i.e., whether the user is a nocturnal user, the nature of programming content and channels, the frequency of changing channels, etc);
(3) interactivity options selected that are selected by a user;
(4) demographics of the user;
(5) interests of the user; and
(6) the "time to live" for a commercial message, i.e., the period of time that the commercial message should be presented.

User Interaction and Selected Options of Commercials

One exemplary embodiment of the present invention allows a user to selectively block commercial messages from being presented. When a commercial message is selectively blocked, the blocked commercial message is replaced in the queue by an unblocked commercial message. Alternatively, the ability to block selected commercial messages may be conditional, such as the ability to block a particular commercial message is enabled after a minimum number of presentations of the commercial message of, for example, three times.

Commercial Message Presentation Mechanism

The present invention uses several techniques for determining when a stored commercial message should be inserted into a broadcast signal 104, and which particular stored commercial message to present. CPE 106 determines when to present a commercial message and what commercial message to select and present based on either a commercial message insertion command instructing CPE 106 to insert a selected stored commercial message into a commercial time slot, or a warning signal that is part of a broadcast signal 104.

The warning signal can be, for example, included in a broadcast signal 104 during a vertical and/or a horizontal blanking period of the broadcast signal. Preferably, the warning signal is transmitted in advance of a commercial time slot (i.e., about a minute in advance). Additionally, information related to a particular commercial message(s) that is (are) to be presented during the commercial time slot may be transmitted so that the stored commercial message(s) can be retrieved from database 128 prior to presentation. Alternatively, commercial messages may be stored and/or processed as needed, such as just before presenting a commercial message to a user, or even when the commercial message is being broadcast. CPE 106 may additionally insert and present stored commercial messages during commercial message time slots between shows.

A warning signal may include some or all of the following information:

(1) The precise start and end times for a commercial message time slot, and information indicating the start and end times are relative to the time of the warning signal or are indicated in terms of an absolute time;
(2) The length of a commercial message time slot;
(3) A particular commercial message(s) that is (are) to be presented during the commercial time slot;
(4) Target audience information (optional and could be ignored); and
(5) Channel identification information.

Additionally or in the alternative, CPE 106 may receive information related to a particular commercial message(s) that is (are) to be presented during commercial time slot through, for example, communications mechanism 112 from a central controller, via text on (television) display, a barcode on a (television) display, audio signals, a DTMF signal, text on VBI portion of a television signal, color code digital signals or using a wireless signal. Generally, though, broadcasters do not want to advise the public of commercial message time slots because users would be able to avoid broadcast commercial messages and devices could be developed that could skip broadcast commercial messages when a program is recorded. Accordingly, the manner and encoding of the signals warning CPE 106 of commercial message time slot information could be proprietary and kept secret.

Processor 116 and/or controller 114 monitor received commercial message insertion command and received warning signals so that a stored commercial message matching either a default criteria or at least one user profile criteria that is stored in user information database 124 can be selected and presented during the commercial message time slot. Additionally, processor 116 and/or controller 114 can select more that one stored commercial message matching either a default criteria or at least one user profile criteria that is stored in user information database 124 for presentation during a commercial message time slot.

When CPE 106 has two transceivers, such as the exemplary configuration of CPE 106 shown in FIG. 1, either transceiver is available for recording additional commercial messages when a stored commercial message is presented. When CPE 106 has only a single transceiver, such as the exemplary configuration of CPE 106 shown in FIG. 2, the transceiver can obtain new commercial messages from either the same channel as it is tuned for receiving broadcast signal 104 or can be returned to another channel when a stored commercial message is presented for recording additional commercial messages.

When a warning signal is not available from broadcast signal 104, CPE 106 could alternatively insert stored commercial messages at predetermined time intervals and/or at predetermined time slots. For example, CPE 106 could insert two minutes of commercial messages every 13 minutes. When a stored commercial message is inserted, CPE 106 may be configured to record the programming content that the user was viewing at the time the commercial message was inserted, so that after the commercial message insertion is complete, the viewer would be able to continue viewing the same programming content from the point when the stored commercial message was inserted. Yet another exemplary alternative embodiment provides that when insertion of a stored commercial message takes place at the time of a regularly scheduled (broadcast) commercial time slot, a user could see a combination of stored commercial messages and broadcast commercial messages. This alternative configuration may be used, depending on the viewed channel and other factors, such as availability of pre-stored commercial messages and user profile criteria.

When a broadcaster 102 intends to deliver broadcaster-sourced commercial messages during live broadcast programming, CPE 106 can be configured to provide a presentation verification function by recording which commercial messages (broadcast and/or stored) have been presented, to which particular user the commercial messages have been presented, and/or which particular interactivity selections have been made.

According to one aspect of the present invention, a user may be given the ability to skip (i.e., fast forward) through a recorded broadcaster-sourced commercial message. Accordingly, skipping may be performed based on, for example, one or more of the following techniques.

(1) Manually-selected skipping by manually selecting a fast-forward button that would, for example, fast forward presentation of a commercial message while the button is selected. The fast-forward button could be provided as a hardware button or a software button. Alternatively, manual skipping could be performed by pressing a programmable skip button that would automatically fast-forward presentation of a commercial message by predetermined amount of time, such as, 30 seconds or a user-selectable amount of time. The present invention also provides for automatically performing manually selected skipping for a predetermined amount of time at predefined intervals, such as automatically fast-forwarding for two minutes every 15 minutes.

(2) A variably accelerated skipping by manually selecting a variably accelerated fast-forward button that would, for example, variably fast forward presentation of a commercial message based on the length of time the button is selected or on a selected slide position of the button.

(3) Automatic skipping in which CPE 106 automatically skips broadcast or recorded broadcaster-sourced commercial message based on commercial time slot information that has been received or downloaded from a control center 130. Accordingly, CPE 106 would insert stored commercial messages during automatic skipping, thereby automatically overriding recorded broadcast commercial messages. For example, when a user is watching CNN live or a recording of CNN, and when the downloaded commercial time slot information for the CNN programming content indicates that there will be a commercial time slot 3 minutes every 15 minutes, between 18:00 and 23:00 daily, then CPE 106 would insert stored commercial messages at the specified break times instead of presenting the recorded broadcast commercial messages. Alternatively, a commercial time slot can be detected using well-known techniques that are based on, for example, detection of a change in pattern of transmission, a change in the number of transmitted lines, etc.

(4) Semi-automatic skipping in which CPE 106 automatically inserts stored commercial messages into a recorded broadcast signal at programmable time intervals and for a set number of minutes. Semi-automatic skipping attempts to override recorded broadcast commercial messages with recorded commercial messages. CPE 106 can be selectively programmed with different time intervals and a different amount of minutes for respectively different channels.

CPE 106 can be manually programmed by a user to record, or learn, start and finish times of commercial message time slots. For example, when a commercial time slot begins while a user is viewing CNN, the user presses a button (hardware button or software button), thereby recording the beginning of the commercial time slot. When the commercial time slot ends, the user again presses a button, thereby recording the end of the commercial time slot. The user can repeat the operation for each broadcast commercial time slot for an entire program, thereby recoding the beginning and end times for commercial time slots during the broadcast program. CPE 106 can then use the recorded commercial time slot information for inserting stored commercial messages into a specific broadcast program.

Manual programming, or learning, of broadcast commercial time slots could be performed for different channels and/or shows. For example, the time interval between each commercial message time slot for CNN might be 15 minutes and each commercial message time slot has 3-minute duration. In contrast, the time interval between each commercial message time slot for ABC might be 12 minutes and each commercial message time slot a 2-minute duration. CPE 106 would appropriately use the different commercial message time slot information for inserting stored commercial messages into the different broadcast signals for CNN and ABC.

Alternatively, a user can view broadcast commercial messages and/or stored commercial messages. For example, when a user wants to view both broadcast and stored commercial messages, the user would first see the broadcast commercial messages, then the stored commercial messages. Alternatively, a user could select to have stored commercial messages presented before the broadcast commercial messages. When a user wants to have only stored commercial messages presented, then the override of broadcast messages could be automatically performed based on, for example, the programmed commercial time slot information.

CPE 106 can be configured so that a user cannot skip all or part of a broadcast commercial message. For example, when CPE 106 is configured to not permit a user to override broadcast commercial messages, when CPE 106 switches back from presenting a stored commercial message(s) to regularly-scheduled broadcast programming, CPE 106 presents the user with the regularly-scheduled broadcast programming from the point of time that stored commercial messages were inserted, regardless of the time length of the particular stored commercial messages that have been presented. Further, as previously noted, presentation of a broadcast commercial message might be mandatory, that is, a user does not have the ability to skip the broadcast commercial message. In such a case, even when a user changes from a current channel to another channel, when the user returns to the first channel within a preset time period, CPE 106 will present the first channel programming by picking up at the point in time when the user changed channels.

When a broadcaster 102 intends not to have a broadcast commercial message overridden by a stored commercial message, CPE 106 can be configured to be responsive to a signal disabling CPE 106 from inserting a stored commercial message in place of a particular broadcast commercial message. Alternatively, CPE 106 can be configured so that a broadcast commercial message is presented unless a stored commercial message having a higher priority message is queued for presentation.

Figure 4:
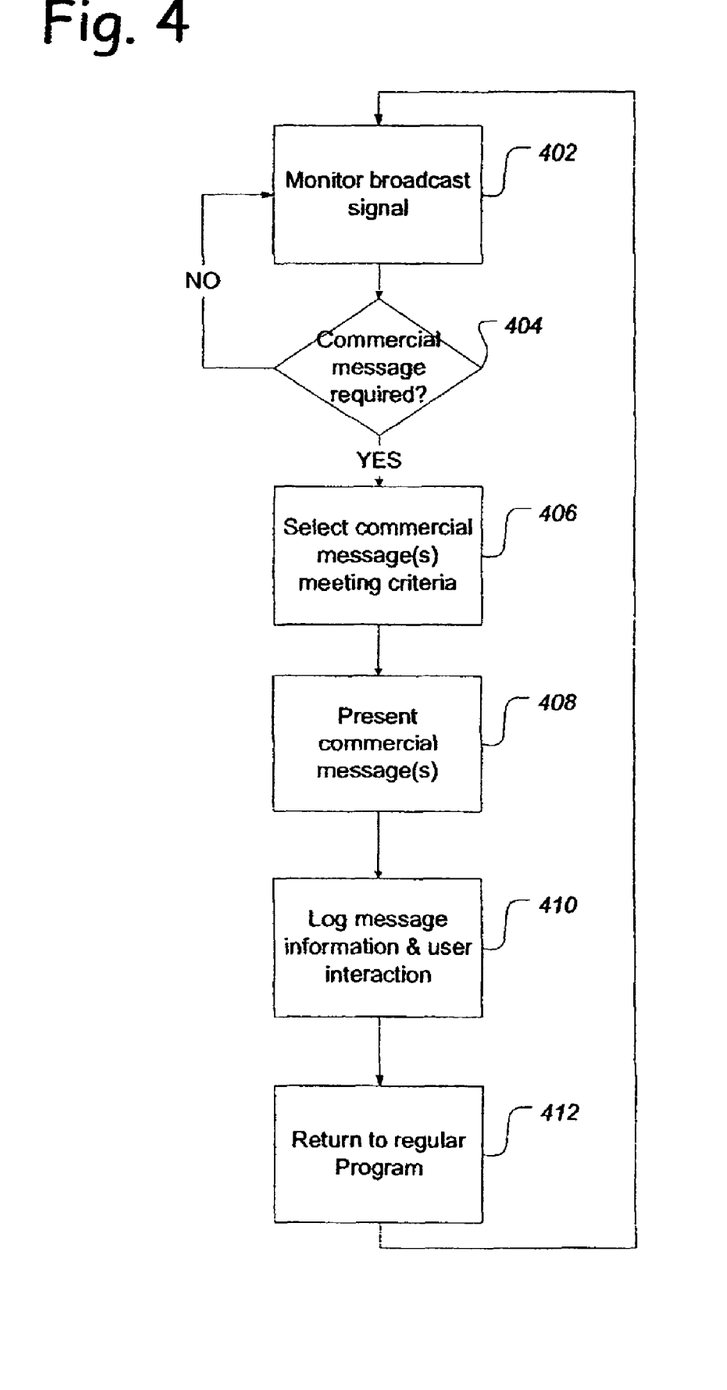
FIG. 4 shows a flow chart for logging commercial message presentation activity according to the invention.

FIG. 4 shows a flow chart for logging commercial message presentation activity according to the invention. For example, transceiver 132 in CPE 106 receives and decodes broadcast signal 104 for current or subsequent viewing during a regular broadcast. Processor 116 and/or controller 114 monitor the received signal at 402. At step 404, it is determined whether an indication that a commercial message is required has been received. Alternatively, at step 404, it is determined whether a commercial message is required based on a time. If, at step 404, it is determined that a commercial message is not required, flow returns to step 402. If, at step 404, an indication that a commercial message is required has been received or it is determined based on time that a commercial message is required, flow continues to step 406 where the appropriate message(s) is (are) retrieved from commercial messages database 128. Flow continues to step 408, where, at the appropriate time, the selected commercial message(s) is (are) presented to the user on, for example, presentation apparatus 112. Flow continues to step 410, where a log 136 contained within memory 118 is maintained of all commercial messages presented, regardless whether any user interaction involved. Alternatively, CPE 106 can be configured to monitor presentation and interactivity options that are selected by the user relating to broadcast commercial messages. Flow continues to step 412, where CPE 106 switches back to the channel that was being presented prior to presenting the commercial message.

Preferably, CPE 106 can be configured for recording regularly broadcast signal 104. For example, programming content broadcast in broadcast signal 104 can be recorded in program content database 126 within memory 118. The manner in which commercial messages are selected and presented for recorded broadcast programming is preferably the same as for real-time broadcast programming content. Consequently, recorded commercial messages and programming content can be overridden by stored commercial messages. Moreover, a user watching recorded broadcast programming may see different commercial messages each time the programming is viewed. For example, each commercial message presented when a recorded broadcast programming is viewed can depend on a time of day that the commercial message is presented. Additionally, different viewers using the same CPE may have different stored commercial messages presented when they each view the same recorded broadcast programming at different times. For example, the stored commercial message that is presented may be based on the viewer's age, gender, marital status, relative income, language, occupation, personal interests, etc.

Interacting with Commercial Messages

A commercial message includes header information that describes criteria for presenting the commercial message. Additionally, header information may include interactivity options for the commercial message. For example, interactivity options can include a prompt for receiving an email message containing additional information related to the commercial message, receiving a regular mail message containing additional information related to the commercial message, placing an order, additional screen shots, etc.

As a user interacts with the message, CPE 106 can be configured to record in log 136 interactivity options that have been selected by the user and associate the interactivity to that a particular commercial message ID. When CPE 106 communicates with, for example, control center 130, the recorded interactivity information may be transmitted so that the commercial message originator can respond appropriately.

Interactivity options associated with a commercial message may be delivered with the commercial message, or may be downloaded separately from, for example, from a control center 130 via communication mechanism 122. Downloading of interactivity options for a commercial message may take place, for example, as soon as CPE 106 stores a new commercial messages, at which time CPE 106 would establish a connection with control center 130 and download the appropriate HTML files and/or other format materials, such as video content, audio content and/or screen shots, that are related to the interactivity options for each stored commercial message.

In some situations, interactivity options may be downloaded at the request of a user, which could be based on a single stored commercial message or a plurality of stored commercial messages. Additionally, CPE 106 can establish a communication link with a control center 130 for obtaining the additional information in situations in which CPE 106 provides limited computing resources or there is limited information and/or intelligence in a commercial message ID, such as special targeting criteria that is requested by advertisers could not be coded into the commercial ID. For example, targeting information indicating that the commercial message is targeted only at users whom have (1) seen automobile commercial messages and (2) interacted with the commercial messages during the past three months. This feature of the present invention conserves memory space within memory 118 until the space is actually needed. For example, when a user is viewing a commercial message and desires to interact with the commercial message, the user would indicate to CPE 106 that interactivity options for the commercial message are desired. CPE 106 would establish a communication link to control center 130 and obtain the interactivity choices for the commercial message. CPE 130 could keep the connection with control center 130 active until the interactivity choices selected by the view are communicated back to control center 130. The communication link would then be closed when interaction with the commercial message is complete.

Log and Feedback

CPE 106 obtains updates from control center 130 and provides feedback information to control center 130. Preferably, CPE 106 establishes a communication link with control center 130 via communication mechanism 122. The feedback information communicated to control center 130 may includes some or all of the following information: commercial messages presented, interactivity options selected by a viewer, broadcast programming viewed, any pool and/or survey data, user portfolio criteria update, and/or information relating to downloaded commercial messages groups. Update information provided from control center 130 to CPE 106 would include some or all of the following information: CPE system software updates and/or electronic programming guide (EPG) updates, and commercial message time slot information.

At preset times (or whenever CPE 106 is idle), information recorded in log 136 may be sent to a control center 130 so that an advertiser can use the log information for monitoring various aspects of a particular user and/or commercial message. For example, the control center may use the response information as a basis for sending more specific, targeted advertising to a particular CPE. Depending on privacy concerns, the CPE may or may not send back user profile information to control center 130. Alternatively, a user can select the amount and type of information that is sent to control center 130.

The frequency of establishing communication links for feedback/update information between CPE 106 and control center 130 can be system dependent or can be based on a predefined schedule for communicating every defined number of days. For system dependent configurations, a CPE monitors user activity along with the number of commercial messages presented. Based on the monitored information, CPE 106 determines how often a communication link is established with control center 130. When CPE 106 detects no activity, CPE 106 would establish a communication link, for example, once every default number of days, such as every fourteen days. When a user views broadcast programming for five consecutive hours a day and has a significant amount of interactivity with commercial messages, CPE 106 could establish a communication link with control center 130 on a relatively more regular basis, such as, every other day.

Alternatively, CPE 106 could be configured so that when there is no feedback information for control center 130, service is denied. For example, when a user infrequently establishes a communication link to control center 130, then that user would get no or limited broadcast programming service. One way a denial of service might be achieved is to broadcast a specific signal to all CPEs causing each CPE to determine whether a particular code is stored in memory 114. Each CPE that does not have the particular code receives limited or no broadcast programming. The code could be valid for a limited time only and could be updated during an established communication link to control center 130. Alternatively, the features provided by CPE 106 may be limited in other ways, including any or all of: limited recording time, more frequent commercial messages, no electronic program guide (EPG) and limited Personal Video Recorder (PVR) functionality.

TV Optical Character Recognition (OCR)

In some embodiments of the present invention, broadcast signal 104 may include information such as a page of textual information. Processor 116 and/or controller 114 may be used for detecting and then presenting characters from the page of textual information onto presentation apparatus 112, such as a television display. The information contained in the page of textual information may also be in the form of a barcode and/or alphanumeric characters, and may encode the message ID of a commercial message along with other information.

As used herein, the terms "displayed," "played" and "presented" should be used in their broadest sense to denote presenting the content embodied in a particular signal in one or more appropriate ways using presentation apparatus 112. Thus, when the presentation device is a radio, the terms "played" and "presented" generally mean producing audio output from the radio. When the presentation device is a television, the terms "played" and "presented" generally mean producing video output on the TV's screen and audio output from the TV's speakers.

As noted above, CPE 106 may be included (built-in) to various devices, such as a television set, a VCR, a digital versatile disk (DVD) device, a PVR device, a radio, and the like. In addition, the CPE may be a stand-alone set-top terminal.

While FIGS. 1 and 2 show different exemplary embodiments of CPE 106, when system 100 deployed, either exemplary embodiment of CPE 106 operates within system 100. That is, some users may have one embodiment of CPE while other users may have another embodiment.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method comprising:
   receiving at least one commercial message from a commercial message source, the at least one commercial message including summary information related to an informational content of the corresponding commercial message;
   determining that the summary information matches a set of criteria;
   storing the at least one commercial message at a customer premises equipment prior to a start time of a broadcast program based on determining that the summary information matches the set of criteria;
   receiving a plurality of user inputs during a display of the broadcast program, wherein a first user input corresponds to a start time of a commercial message time slot and a second user input corresponds to an end time of the commercial message time slot;
   learning, by the customer premises equipment, a start time and an end time of a plurality of commercial message time slots for one or more future broadcast programs based on the plurality of user inputs; and
   automatically displaying the stored at least one commercial message during a future broadcast program in at least one of the plurality of commercial message time slots based on the learned start and end times.

2. The method of claim 1, further comprising:
   receiving, by the customer premises equipment, a broadcast schedule for one or more commercial message groups, wherein the broadcast schedule specifies a plurality of times at which a commercial message group will be broadcast, the plurality of times including a first time and a second time; and
   receiving at least one commercial message signal including a plurality of commercial messages from a commercial message source, the plurality of commercial messages including the at least one commercial message, each of the plurality of commercial messages including summary information related to an informational content of the corresponding commercial message, wherein one or more of the plurality of commercial messages correspond to a group number assigned to the commercial message group.

3. The method of claim 2, wherein storing the at least one commercial message includes:
   responsive to determining that the one or more commercial messages corresponding to the group number have not been stored in a database at the first time, selectively storing, by the customer premises equipment, each of the plurality of commercial messages received from the commercial message source based on a group identifier of each of the plurality of commercial messages, wherein selectively storing each of the plurality of commercial messages includes storing the one or more commercial messages corresponding to the group number at the second time.

4. The method according to claim 1, further comprising a step of receiving at least one programming content signal.

5. The method according to claim 4, wherein the at least one programming content signal is a television broadcast signal.

6. The method according to claim 4, wherein the at least one programming content signal is a radio broadcast signal.

7. The method according to claim 4, wherein the at least one programming content signal is a cable television signal.

8. The method according to claim 4, wherein the at least one programming content signal is a satellite broadcast signal.

9. The method according to claim 4, wherein the at least one programming content signal is received from a storage medium.

10. The method according to claim 4, further comprising steps of:
presenting the at least one programming content signal; and
presenting the at least one stored commercial message to a user in conjunction with the step of presenting the at least one programming content signal based on the summary information included in the commercial message.

11. The method according to claim 1, further comprising a step of presenting the at least one stored commercial message to a user based on the summary information included in the at least one stored commercial message.

12. The method according to claim 3, wherein the summary information relates to the informational content of each of the plurality of commercial messages including information related to at least one of an identification number of the corresponding commercial message, a length of the corresponding commercial message, a predetermined time for presenting the corresponding commercial message, a demography of a targeted audience for the corresponding commercial message, a priority for presenting the corresponding commercial message, a number of times for presenting the corresponding commercial message, a frequency for presenting the corresponding commercial message, a programming content associated with the corresponding commercial message, a predetermined time duration for presenting the corresponding commercial message, and geographical target information associated with the corresponding commercial message.

13. The method according to claim 12, wherein demography information for the target audience includes information relating to at least one of a target age, a target gender, a marital status, a relative income, a language, an occupation and a personal interest.

14. The method according to claim 2, wherein the summary information related to the informational content of each of the plurality of commercial messages includes at least one broadcast channel associated with each of the plurality of commercial messages for presentation of each commercial message.

15. The method according to claim 3, wherein the step of selectively storing each of the plurality of commercial messages is further performed based on the summary information, including:
determining whether the summary information included in each of the plurality of commercial messages matches a predetermined set of criteria; and
storing the at least one commercial message having the summary information matching the predetermined set of criteria.

16. The method according to claim 15, wherein the predetermined set of criteria includes at least one of geographical and user demographic information.

17. The method according to claim 15, wherein the predetermined set of criteria is a non-user specific default set of criteria.

18. The method according to claim 2, wherein the at least one received commercial message signal is a television broadcast signal.

19. The method according to claim 2, wherein the at least one received commercial message signal is a radio broadcast signal.

20. The method according to claim 2, wherein the at least one received commercial message signal is a cable television signal.

21. The method according to claim 2, wherein the at least one commercial message signal is a satellite broadcast signal.

22. The method according to claim 2, wherein the at least one received commercial message signal is received from a storage medium.

23. The method according to claim 2, wherein each received commercial message signal is received by the customer premises equipment (CPE).

24. The method according to claim 23, wherein the CPE is one of a stand-alone device, part of a radio, part of a television set, part of a satellite receiver, part of a video cassette recorder, part of a digital versatile disk (DVD) device and part of a personal video recorder device.

25. The method according to claim 2, wherein each of the plurality of commercial messages includes information relating to one of an advertisement, an emergency announcement and a public service announcement.

26. The method of claim 1, further comprising:
receiving at least one of a warning signal and a commercial message insertion command,
wherein the displaying of the stored at least one commercial message is further responsive to the receiving of the at least one of a warning signal and a commercial message insertion command.

27. The method of claim 1, wherein learning the start time and the end time of the plurality of commercial message time slots includes learning a commercial message time slot duration and an interval between commercial message time slots.

28. The method of claim 27, wherein learning the commercial message time slot duration and learning the interval between commercial message time slots is performed on a channel by channel basis.

29. The method of claim 3, wherein the customer premises equipment further comprises a plurality of queues including at least one queue for each of a plurality of users associated with the customer premises equipment and wherein the method further comprises:
queuing at least one of the plurality of commercial messages in a queue specific to a user operating the customer premises equipment.

30. The method of claim 29, wherein the plurality of queues includes a first queue for queuing content to be presented in a first channel and a second queue for queuing content to be presented in a second channel different from the first channel.

31. The method of claim 1, wherein the set of criteria includes a frequency for presenting the commercial message.

32. An apparatus comprising:
at least one processor; and memory operatively coupled to the at least one processor and storing computer readable instructions that, when executed, cause the apparatus to:
- receive at least one commercial message from a commercial message source, the at least one commercial message including summary information related to an informational content of the corresponding commercial message;
- determine that the summary information matches a set of criteria;
- store the at least one commercial message at a customer premises equipment prior to a start time of a broadcast program based on determining that the summary information matches the set of criteria;
- receive a plurality of user inputs during a display of the broadcast program, wherein a first user input corresponds to a start time of a commercial message time slot and a second user input corresponds to an end time of the commercial message time slot;
- learn, by the customer premises equipment, a start time and an end time of a plurality of commercial message time slots for one or more future broadcast programs based on the plurality of user inputs; and
- automatically display the stored at least one commercial message during a future broadcast program in at least one of the plurality of commercial message time slots based on the learned start and end times.

33. The apparatus of claim 32, wherein the computer readable instructions, when executed, further cause the apparatus to:
- receive, by the customer premises equipment, a broadcast schedule for one or more commercial message groups, wherein the broadcast schedule specifies a plurality of times at which a commercial message group will be broadcast, the plurality of times including a first time and a second time; and
- receive at least one commercial message signal including a plurality of commercial messages from a commercial message source, the plurality of commercial messages including the at least one commercial message, each of the plurality of commercial messages including summary information related to an informational content of the corresponding commercial message, wherein one or more of the plurality of commercial messages correspond to a group number assigned to the commercial message group.

34. The apparatus of claim 33, wherein the computer readable instructions, when executed, further cause the apparatus to:
- responsive to determining that the one or more commercial messages corresponding to the group number have not been stored in a database at the first time, selectively store, by the customer premises equipment, each of the plurality of commercial messages received from the commercial message source based on a group identifier of each of the plurality of commercial messages,
- wherein selectively storing each of the plurality of commercial messages includes storing the one or more commercial messages, corresponding to the group number at the second time.

* * * * *

UNITED STATES PATENT AND TRADEMARK OFFICE
CERTIFICATE OF CORRECTION

PATENT NO. : 7,941,817 B2  Page 1 of 1
APPLICATION NO. : 10/151244
DATED : May 10, 2011
INVENTOR(S) : Raed Khuseim It is certified that error appears in the above-identified patent and that said Letters Patent is hereby corrected as shown below:

Column 22, Claim 34, Line 29:
Please delete "messages, corresponding" and insert --messages corresponding--

Signed and Sealed this
Twenty-first Day of February, 2012

David J. Kappos
*Director of the United States Patent and Trademark Office*